(12) United States Patent
Ni et al.

(10) Patent No.: US 10,940,803 B2
(45) Date of Patent: Mar. 9, 2021

(54) SIMPLE VEHICLE RACK

(71) Applicant: FORCOME (ZHEJIANG) CO., LTD., Jinhua (CN)

(72) Inventors: Xiaojun Ni, Jinhua (CN); Chengsheng Fang, Jinhua (CN); Jing Xiong, Jinhua (CN); Jiancheng Wang, Jinhua (CN)

(73) Assignee: FORCOME (ZHEJIANG) CO., LTD., Jinhua (CN)

( * ) Notice: Subject to any disclaimer, the term of this patent is extended or adjusted under 35 U.S.C. 154(b) by 0 days.

(21) Appl. No.: 16/780,854

(22) Filed: Feb. 3, 2020

(65) Prior Publication Data

US 2020/0406826 A1 Dec. 31, 2020

(30) Foreign Application Priority Data

Jun. 28, 2019 (CN) .......................... 201920994826.2

(51) Int. Cl.
*B60R 9/058* (2006.01)
*B60R 9/00* (2006.01)

(52) U.S. Cl.
CPC ................ *B60R 9/058* (2013.01); *B60R 9/00* (2013.01)

(58) Field of Classification Search
CPC .............. B60R 9/058; B60R 9/00; B60P 3/40
USPC ................................ 224/315; 410/104; 296/3
See application file for complete search history.

(56) References Cited

U.S. PATENT DOCUMENTS

| | | | | |
|---|---|---|---|---|
| 5,002,324 A | * | 3/1991 | Griffin ...................... | B60P 3/42 224/405 |
| 5,137,320 A | * | 8/1992 | Christensen .............. | B60R 9/00 224/405 |
| 5,494,327 A | * | 2/1996 | Derecktor ................. | B60P 3/40 224/321 |
| 5,848,743 A | * | 12/1998 | Derecktor ............... | B60R 9/058 224/331 |
| 6,585,465 B1 | * | 7/2003 | Hammond ............ | B60P 7/0815 410/104 |
| 6,791,563 B2 | * | 9/2004 | Bragg ...................... | G06T 15/04 345/426 |
| 6,971,563 B2 | * | 12/2005 | Levi .......................... | B60P 3/40 224/403 |
| 7,156,593 B1 | * | 1/2007 | Saward .................. | B60P 7/0815 410/104 |
| D582,337 S | * | 12/2008 | Derecktor .................... | D12/406 |
| 7,464,977 B1 | * | 12/2008 | Price ......................... | B60P 3/40 296/26.05 |
| 7,753,425 B2 | * | 7/2010 | Niedziela .................. | B60P 3/40 296/3 |
| 8,277,157 B2 | * | 10/2012 | Parsons ................ | B61D 45/001 410/104 |

(Continued)

*Primary Examiner* — Nathan J Newhouse
*Assistant Examiner* — Lester L Vanterpool
(74) *Attorney, Agent, or Firm* — SZDC Law P.C.

(57) ABSTRACT

A simple vehicle rack includes: a fixing rod, a middle part of the fixing rod being an H-shaped reinforcing seat, the H-shaped reinforcing seat forming an upper sliding slot on a top surface of the fixing rod and forming a lower sliding slot on a bottom surface of the fixing rod; two fixing frames, the fixing frames being fixed on the top surface of the fixing rod and connected to the fixing rod, moving back and forth along the upper sliding slot; and two support frames, the support frames being fixed on the bottom surface of the fixing rod and connected to the fixing rod, moving back and forth along the lower sliding slot.

6 Claims, 5 Drawing Sheets

(56) References Cited

U.S. PATENT DOCUMENTS

| | | | | |
|---|---|---|---|---|
| 8,668,125 B2* | 3/2014 | Williams | | B60R 9/06 224/405 |
| 9,566,914 B2* | 2/2017 | Marr, Jr. | | B62D 33/0207 |
| 9,586,629 B2* | 3/2017 | Leitner | | B60R 9/058 |
| 9,623,787 B2* | 4/2017 | Sterling | | B60P 7/0815 |
| 9,834,258 B2* | 12/2017 | Marr, Jr. | | B60R 9/06 |
| 9,975,466 B2* | 5/2018 | Hendren | | B60P 7/0807 |
| 10,421,385 B2* | 9/2019 | Chambers | | B62D 33/023 |
| 10,543,790 B2* | 1/2020 | Marr, Jr. | | B60R 9/00 |
| 2004/0131440 A1* | 7/2004 | Womack | | B61D 45/001 410/104 |
| 2005/0036848 A1* | 2/2005 | Cunningham | | F16B 37/045 410/104 |
| 2006/0257225 A1* | 11/2006 | Klinkman | | F16B 37/045 410/104 |
| 2006/0263163 A1* | 11/2006 | Harberts | | B61D 45/001 410/104 |
| 2008/0100075 A1* | 5/2008 | Derecktor | | B60P 3/40 296/3 |
| 2009/0026784 A1* | 1/2009 | Green | | B60R 9/00 296/3 |
| 2009/0080995 A1* | 3/2009 | Peterson | | B60P 7/0815 410/104 |
| 2010/0072237 A1* | 3/2010 | Green | | B60R 9/00 224/405 |
| 2010/0202850 A1* | 8/2010 | Parsons | | B60P 7/0815 410/104 |
| 2010/0288808 A1* | 11/2010 | Marr, Jr. | | B60R 9/06 224/403 |
| 2013/0309037 A1* | 11/2013 | Bender | | B60P 7/06 410/104 |
| 2015/0197202 A1* | 7/2015 | Harrison | | B62D 33/02 296/3 |
| 2016/0059906 A1* | 3/2016 | Leitner | | B60R 9/06 296/3 |

* cited by examiner

SIMPLE VEHICLE RACK

This application claims priority to Chinese Patent Application No.: 201920994826.2, filed on Jun. 28, 2019, which is incorporated by reference for all purposes as if fully set forth herein.

TECHNICAL FIELD

This application relates to a simple vehicle rack.

BACKGROUND TECHNOLOGY

The existing simple vehicle rack consists of a fixing rod with support at the bottom of both ends of the fixing rod, a fixed seat at the bottom of the supporting rod. The fixed seat is fixed on the vehicle trailer. A fixed frame for the fixing of the binding rope on the fixing rod. A slot is arranged along the length of the fixing rod of the existing simple vehicle shelf. The upper end of the support frame is connected to the sliding slot of the fixing rod through bolts and clamping plates, and the two fixing frames above the fixing rod are also provided on the sliding slot of the fixing rod. When the fixed frame set in this way adjusts the space between the two fixed frames, when the fixed frame slides to the fixed point of the support frame, it cannot slide to the end of the fixing rod outside the support frame, but can only be fixed to the inside of the support frame, which greatly limits the width of goods placed. Secondly, there is only one fixed hole on the fixed pole of the existing vehicle rack, and the position is higher than that of the fixed pole. When the vehicle is flat, the tie rope fixed on the two fixed racks cannot compact the vehicle. Moreover, the fastening bolts of the fixed seat of the existing vehicle rack fixed on the vehicle trailer fence are all welded in the bolt sleeve of the fixed seat body. If the fixed seat is fixed on the vehicle trailer fence board, the fastening bolt is fixed in the same position as the pull rope on the vehicle trailer fence board, and the fastening bolts of the fixed seat are fixed in the same position, and the bolt of the fixed seat cannot be fixed. Therefore, the support frame and the fixed seat must be moved, which is not only troublesome, but also may lead to inappropriate fixed position of the support frame.

SUMMARY OF THE INVENTION

In one embodiment, a simple vehicle rack includes: a fixing rod, a middle part of the fixing rod being an H-shaped reinforcing seat, the H-shaped reinforcing seat forming an upper sliding slot on a top surface of the fixing rod and forming a lower sliding slot on a bottom surface of the fixing rod; two fixing frames, the fixing frames being fixed on the top surface of the fixing rod and connected to the fixing rod, moving back and forth along the upper sliding slot; and two support frames, the support frames being fixed on the bottom surface of the fixing rod and connected to the fixing rod, moving back and forth along the lower sliding slot.

In another embodiment, both sides of the upper sliding slot include upper locking sheets that extend inward; both sides of the lower sliding slot include lower locking sheets that extend inward; the two fixing frames each include an I-shaped slide block extending from the bottom of the fixing frames; an end of the top of the I-shaped slide block is connected to a knob connecting part; a knob passes through the knob connecting part and connects with a first clamping plate at a lower surface of the knob connecting part; the fixing frames connect the upper sliding slot through the I-shaped slide block; the lower surface of the knob connecting part and the clamping plate are clamped together with the upper locking sheets via the knob; the supporting frames each includes a second clamping plate, the second clamping plate being connected to the supporting frames by a bolt; and the second clamping plate is clamped with the lower locking sheets via the bolt.

In another embodiment, the supporting frames each includes an upper connector; the upper connector includes a bolt connecting part; and the bolt passes through the bolt connecting part and the second clamping plate to clamp the lower locking sheets.

In another embodiment, the fixing frames include two or more fixed holes of different heights.

In another embodiment, the fixing rod includes closed covers at both ends, and the closed covers seal both ends of the upper sliding slot and the lower sliding slot.

In another embodiment, the supporting frames each includes a lower connector; a fixed seat is provided under the lower connector; the fixed seat includes a seat body, a moving clamp, and a fastening bolt; the seat body is a right-angle aluminum alloy plate and includes a sliding slot on top, the top surface of the seat body connecting with the lower connector; the moving clamp is a C-shaped aluminum alloy clamp and includes a slider and a fastening bolt hole; and the fastening bolt passes through the fastening bolt hole to secure the seat body to a vehicle.

In another embodiment, the supporting frames each include two moving clamps and two fastening bolts.

In another embodiment, a fastening block is provided on the top of the fastening bolt.

Compared with the prior art, the advantages of the present application are as follows: 1. The space between the two fixed frames can be adjusted to suit more specifications of cargo carrier; 2. The design of multi-height fixed holes makes the goods of various heights more firmly bound. 3. The fixed point of the fixed seat can be changed, so that it can be fixed around obstacles without changing the position of the support frame and the fixed seat body, so that the support frame can be fixed more reasonably.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Figure 1:
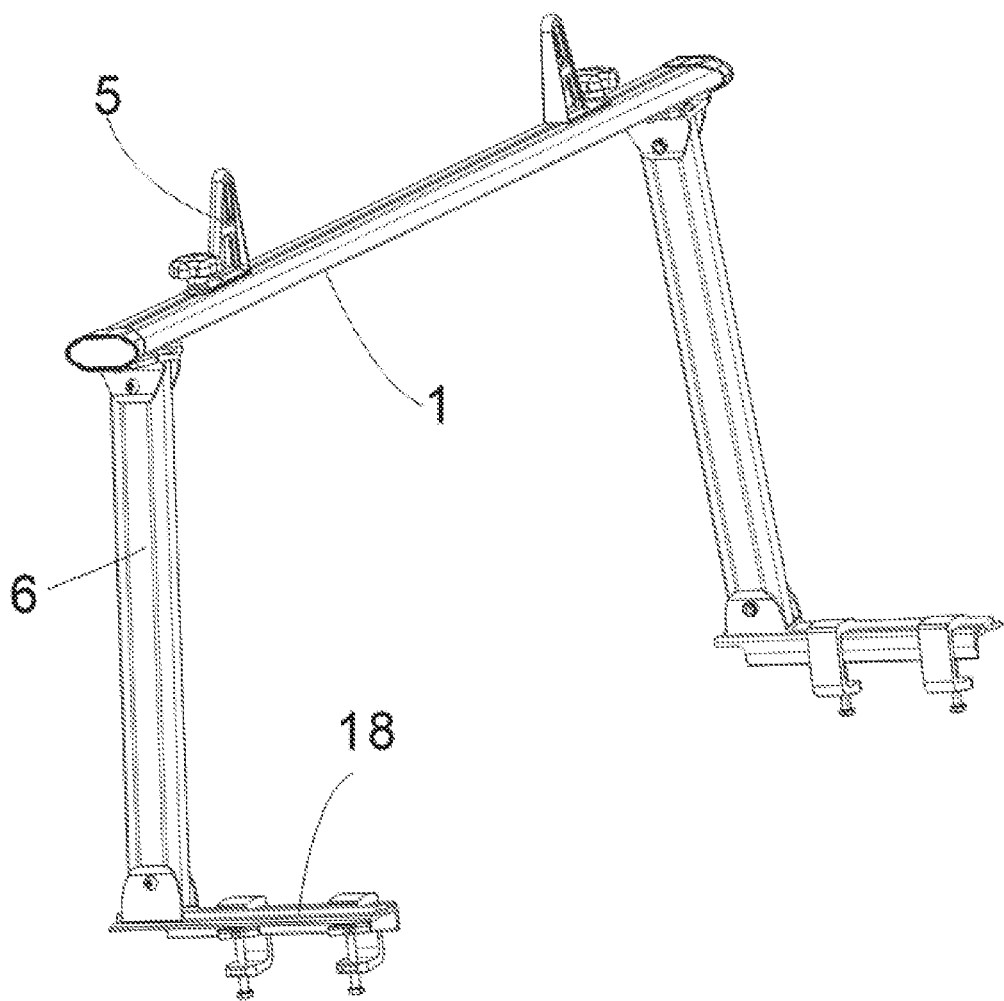
FIG. 1 is a schematic diagram of the simple vehicle shelf structure mentioned in the present application.

The reference numerals indicate that: 1. Fixing rod; 2. H-shaped reinforcing seat; 3. Upper sliding slot; 4. Lower sliding slot; 5. Fixed frame; 6. Support frame; 7. Upper and lower locking sheets; 8. I-shaped slider; 9. Knob connection part; 10. Knobs; 11. First and Second clamping plates; 12. Bolts; 13. Upper connector; 14. Bolt connection part; 15. Fixed hole; 16. Closed cover; 17. Lower connector; 18.

Fixed seat; 19. Seat body; 20. Moving clamp; 21. Fastening bolts; 22. Slide slot; 23. Slider; 24. Fastener block.

DETAILED DESCRIPTION OF THE ILLUSTRATED EMBODIMENTS

The present application is described in detail in the following paragraphs by referring to the attached drawings and combining with embodiments. It is to be noted that embodiments in this application and features in embodiments may be combined without conflict.

In the description of the present application, it is necessary to understand that the terms "center," "top," "bottom," "left," "right," "vertical," "horizontal," "inside," "outside," "bottom," "top" and other indicative orientation or position relations are based on the orientation or position relations shown in the drawings. This is intended only for the convenience of describing and simplifying the description of the present application, and is not intended to indicate or imply that the device or element referred to must have a specific orientation, or be constructed and operated in a specific orientation, and therefore cannot be understood as a limitation on the new form of the utility.

Embodiment 1

Referring to FIG. 1, the simple vehicle rack provided by the present embodiment consists of a fixed pole 1, a fixed frame 5, a support frame 6 and a fixed seat 18, among them, the fixed frame 5, the support frame 6 and the fixed seat 18 are two. The two fixed frame 5 are movably fixed at the top of the fixed pole 1, and two support frames 6 are movably fixed at the bottom of the fixed pole 1. Meanwhile, a fixed seat 18 is fixed on each support frame 6.

Figure 2:
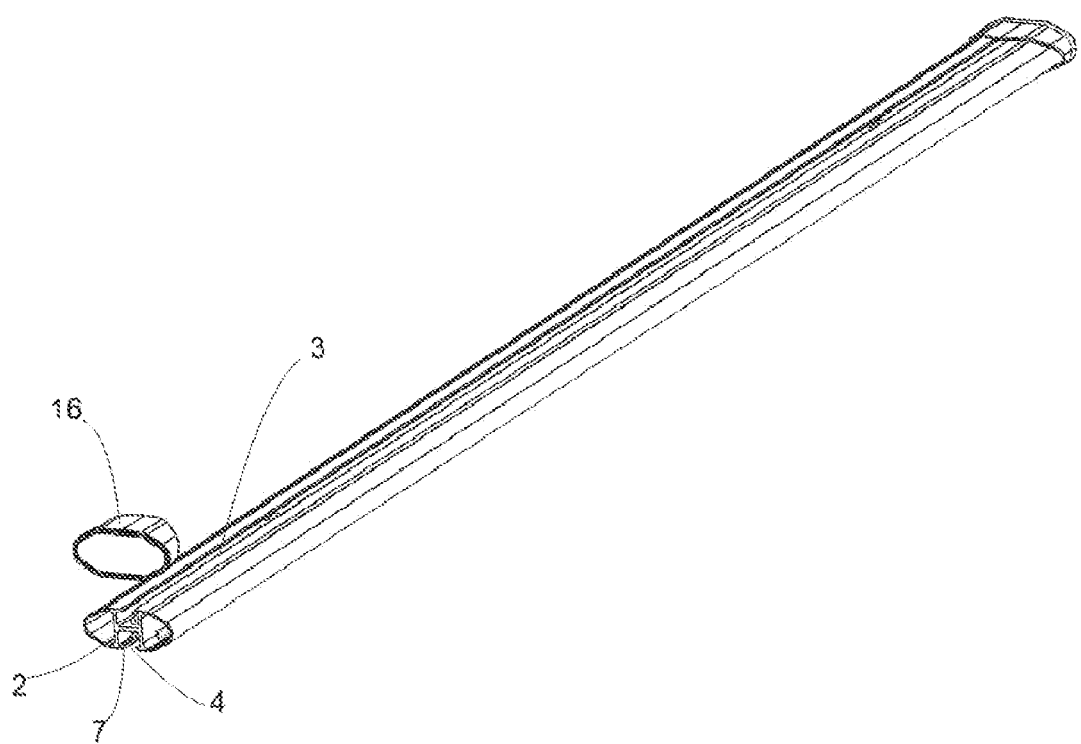
FIG. 2 is a schematic diagram of the fixing rod structure mentioned in the present application.

Referring to FIG. 2, the fixing rod 1 is a hollow aluminum alloy tube. The center of the tube body is a H-shaped reinforcing seat 2. The H-shaped reinforcing seat 2 makes the upper and lower sides of the aluminum alloy tube plane form an upper sliding slot 3 and a lower sliding slot 4 along the length of the aluminum alloy tube. At the same time, the upper sliding slot 3 and the lower sliding slot 4 extend with corresponding locking sheets 7. Meanwhile the closed cover 16 is fixed on the left and right sides of the fixing rod 1. The closed cover 16 closes the left and right sides of the upper chute 3 and the lower chute 4.

Figure 3:
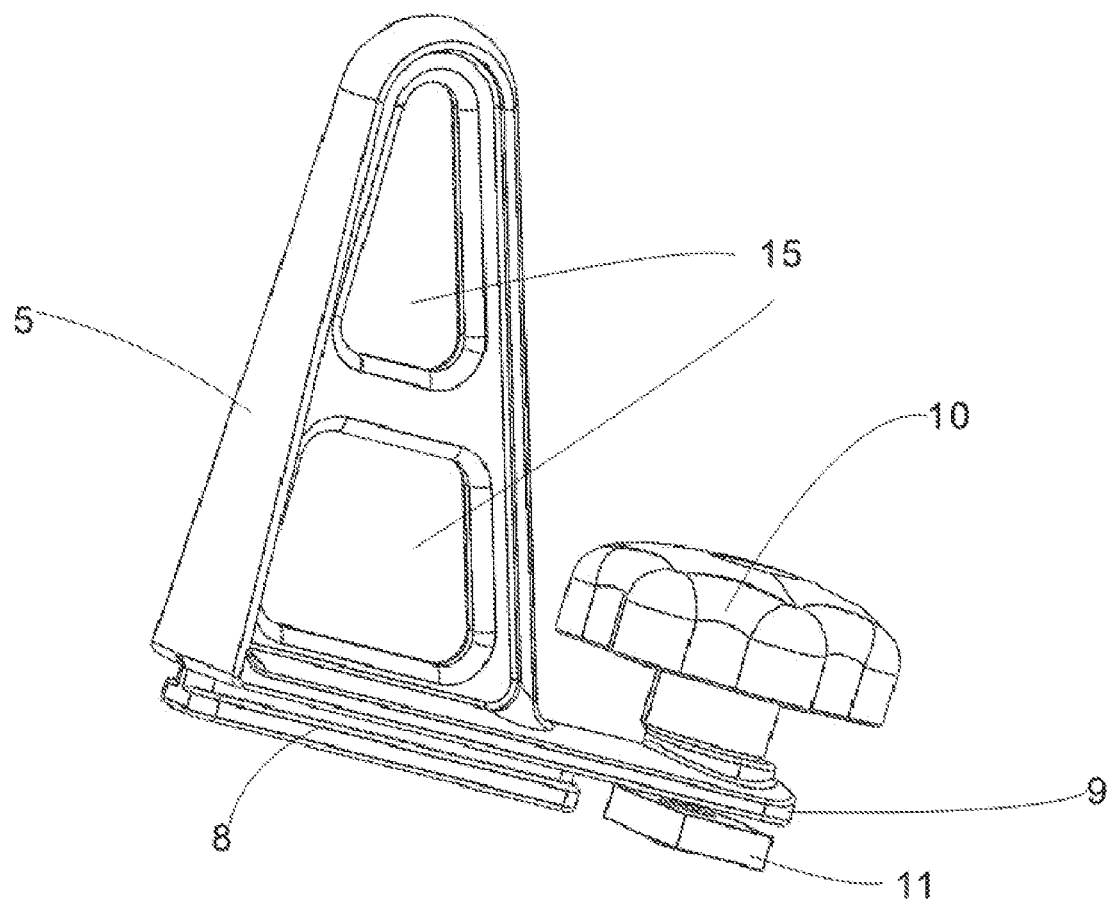
FIG. 3 is a schematic diagram of the fixing frame structure mentioned in the present application.

Refer to FIG. 3, fixing frame 5 is a triangle frame. Fixing frame 5 has two vertical relative fixed holes 15 horizontally. Fixing frame 5 has I-shaped slider 8 at the lower end. I-shaped slider 8 extends knob connection 9 at the right side. Bolt holes are opened on knob connection 9. Bolts in center 10 of knob pass through bolt hole and knob connection 9 at the bottom. The clamp plate 11 on the side is screwed. The I-shaped slider 8 of the fixing frame 5 is inserted into the upper sliding slot 3 of the fixing rod 1. The clamp plate 11 is below the upper sliding slot 3 of the fixing rod 1, and the knob connection 9 of the fixing frame 5 is above the upper sliding slot 3. The fixing frame 5 slides through the I-shaped slider 8 in the upper sliding slot 3 of the fixing rod 1 to adjust the two fixing frames 5. The spacing is fixed by bolting the knob 10 to lock the knob connection 9 on the clamping plate 11 and the fixing frame 5 to the sliding slot 3 on the fixing rod 1.

Figure 4:
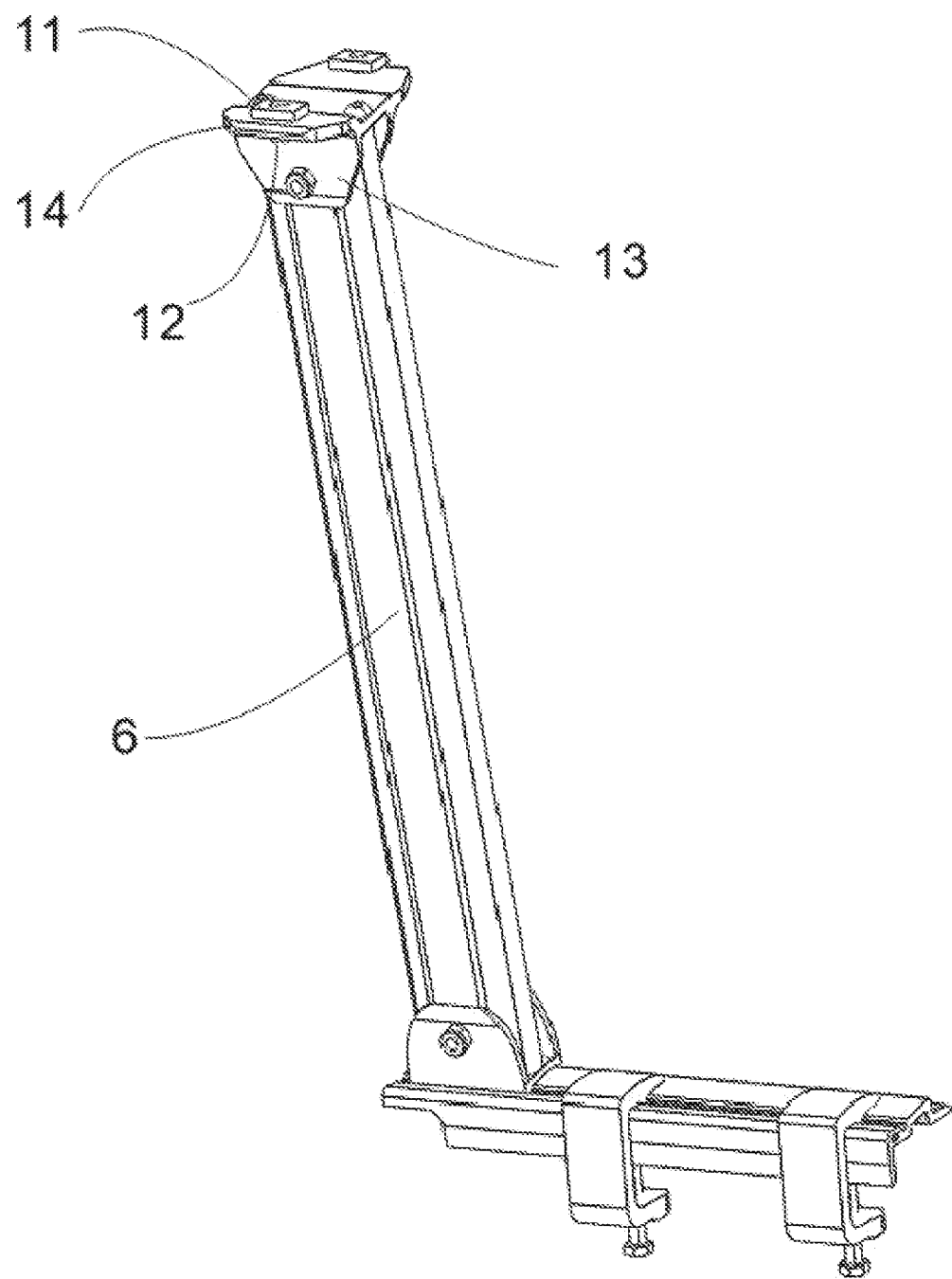
FIG. 4 is a schematic diagram of the support frame structure mentioned in the present application.

Referring to FIG. 4, the upper end of the supporting frame 6 is fixed with the upper connector 13, the upper connector 13 of the support frame 6 is extended with the bolt connecting part 14 on both sides, and the bolt connecting part 14 is provided with bolt connecting holes. The bolt 12 passes through the bolt connecting part 14 from the bottom to the top and then screws with the clamping plate 11 (where the clamping plate is not the clamping plate in the upper sliding slot). The upper connector 13 on the supporting frame 6 is connected to the sliding slot 4 of the fixing rod 1 through the clamping plate 11 and the bolt connecting part 14, and can be sliding adjusted or fixed along the sliding slot 4.

Figure 5:
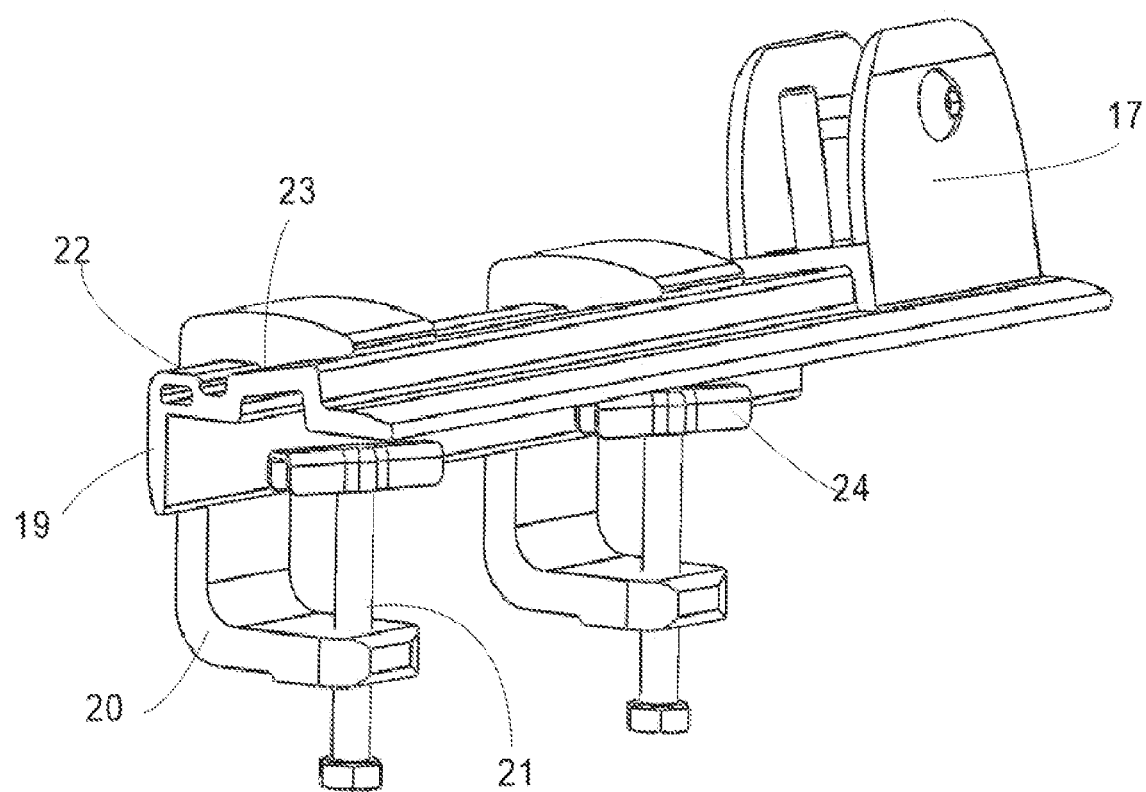
FIG. 5 is a schematic diagram of the fixed seat mentioned in the present application.

Referring to FIG. 5, the fixing seat 18 includes a fixing seat 19, a moving clamp 20 and a fastening bolt 21. The fixing seat 19 is a right-angle aluminum alloy plate. The upper right side of the fixing seat is riveted with the lower connecting head 17 of the supporting frame 6. A sliding slot 22 is arranged on the horizontal surface of the fixing seat 19. The moving clamp 20 is a semi-frame aluminum alloy seat, and the bottom surface of the moving clamp 20 is extended with a strip slider 23. A fastening bolt hole is opened at the lower end face. The fastening bolt is screwed in the fastening bolt 21 hole, and a fastening bolt 24 is fixed at the top of the fastening bolt 21. As the best choice, the above mentioned moving clamp 20 is two. The slider 23 of the moving clamp 20 is stuck in the slide 22, and the vertical plane of the moving clamp 20 is against the fixed seat 19. When in use, the upper and lower sides of the fixed seat body 19 are attached to the top of the frame of the railing board of the truck trailer, and the lower end of the moving clamp 20 is located at the bottom of the frame of the truck trailer. By fastening bolt 21 to the lower part of the frame of the drag panel, the fixed seat is fixed with the drag panel. When the fixed position of the moving clamp 20 meets obstacles, loosen the fastening bolt 21 so that the moving clamp 20 slides along the fixed seat body 19 to adjust the fixed position.

The simple vehicle shelf with the above structure is equipped with upper and lower chutes on the fixing rod. The upper end of the support frame slides and adjusts in the sliding groove of the fixing rod, while the fixed frame slides and adjusts in the sliding groove of the fixing rod. The two regulating devices do not interfere with each other, so that the fixed frame can slide to the end of the fixing rod, and the distance between the two fixed frames can be adjusted in a wider range, suitable for more cargo carrier; Secondly, there are several fixed holes on the fixing frame body. When the thickness of the goods is thin, the tie rope can be fixed in the lower fixed holes to make the goods more firmly bound. Then, the moving clamp and the fixed seat body can slide along the fixed seat body through the combination of slider and chute. When there are obstacles in the fixed seat, the position of the moving clamp can be moved and fixed around the obstacles without changing the position of the support frame and the fixed seat body, so that the support frame can be fixed more reasonably.

The above mentioned are only preferred embodiments of the new practical form and are not used to limit the new practical form. The invention can have various changes and variations for technicians in the field. Any modification, equivalent substitution, improvement, etc. made within the spirit and principles of this practical novelty shall be included in the scope of protection of the present invention.

The invention claimed is:
1. A simple vehicle rack comprising:
 a fixing rod, a middle part of the fixing rod being an H-shaped reinforcing seat, the H-shaped reinforcing seat forming an upper sliding slot on a top surface of the fixing rod and forming a lower sliding slot on a bottom surface of the fixing rod;

two fixing frames, the fixing frames being fixed on the top surface of the fixing rod and connected to the fixing rod, moving back and forth along the upper sliding slot; and two support frames, the support frames being fixed on the bottom surface of the fixing rod and connected to the fixing rod, moving back and forth along the lower sliding slot;

wherein:

both sides of the upper sliding slot include upper locking sheets that extend inward;

both sides of the lower sliding slot include lower locking sheets that extend inward;

the two fixing frames each include an I-shaped slide block extending from the bottom of the fixing frames;

an end of the top of the I-shaped slide block is connected to a knob connecting part;

two knobs each pass through the knob connecting part and connects with a first clamping plate at a lower surface of the knob connecting part;

the fixing frames connect the upper sliding slot through the I-shaped slide block;

the lower surface of the knobs connecting part and the clamping plate are clamped together with the upper locking sheets via the knobs;

the supporting frames each includes a second clamping plate, the second clamping plate being connected to the supporting frames by a bolt;

the second clamping plate is clamped with the lower locking sheets via the bolt;

the two fixing frames each include a top fixed hole and a bottom fixed hole that are of different heights and vertically placed on top of the I-shaped slide block, the top fixed hole has a triangular shape, and the bottom fixed hole has a trapezoidal shape; and the two fixing frames and the two knobs are each located at corresponding ends of the I-shaped slide block and extend upward.

2. The simple vehicle rack according to claim 1, wherein the supporting frames each includes an upper connector; the upper connector includes a bolt connecting part; and the bolt passes through the bolt connecting part and the second clamping plate to clamp the lower locking sheets.

3. The simple vehicle rack according to claim 1, wherein the fixing rod includes closed covers at both ends, and the closed covers seal both ends of the upper sliding slot and the lower sliding slot.

4. The simple vehicle rack according to claim 1, wherein the supporting frames each includes a lower connector; a fixed seat is provided under the lower connector; the fixed seat includes a seat body, a moving clamp, and a fastening bolt;

the seat body is a right-angle aluminum alloy plate and includes a sliding slot on top, the top surface of the seat body connecting with the lower connector;

the moving clamp is a C-shaped aluminum alloy clamp and includes a slider and a fastening bolt hole; and the fastening bolt passes through the fastening bolt hole to secure the seat body to a vehicle.

5. The simple vehicle rack according to claim 4, wherein the supporting frames each include two moving clamps and two fastening bolts.

6. The simple vehicle rack according to claim 5, wherein a fastening block is provided on the top of the fastening bolt.

* * * * *